(12) United States Patent
Betsui

(10) Patent No.: US 8,658,988 B2
(45) Date of Patent: Feb. 25, 2014

(54) THREE-DIMENSIONAL IMAGE PROJECTOR

(71) Applicant: Hitachi Consumer Electronics Co., Ltd., Tokyo (JP)

(72) Inventor: Keiichi Betsui, Yokohama (JP)

(73) Assignee: Hitachi Consumer Electronics Co., Inc., Tokyo (JP)

( * ) Notice: Subject to any disclaimer, the term of this patent is extended or adjusted under 35 U.S.C. 154(b) by 0 days.

(21) Appl. No.: 13/871,424

(22) Filed: Apr. 26, 2013

(65) Prior Publication Data

US 2013/0341508 A1    Dec. 26, 2013

(51) Int. Cl.
*G03B 21/00* (2006.01)
*G01J 1/58* (2006.01)
*F21V 33/00* (2006.01)

(52) U.S. Cl.
USPC ............... 250/458.1; 353/7; 353/31; 362/84

(58) Field of Classification Search
USPC ........ 250/458.1, 459.1; 353/7, 30, 31; 362/84
See application file for complete search history.

(56) References Cited

U.S. PATENT DOCUMENTS

| | | | | |
|---|---|---|---|---|
| 5,684,621 A * | 11/1997 | Downing | ....................... | 359/326 |
| 5,914,807 A * | 6/1999 | Downing | ....................... | 359/326 |
| 5,943,160 A * | 8/1999 | Downing | ....................... | 359/326 |
| 5,956,172 A * | 9/1999 | Downing | ....................... | 359/326 |
| 6,283,597 B1 * | 9/2001 | Jorke | ............... | 353/31 |
| 2013/0170177 A1 * | 7/2013 | Levola et al. | ................... | 362/84 |
| 2013/0242534 A1 * | 9/2013 | Pettitt et al. | ..................... | 362/84 |

FOREIGN PATENT DOCUMENTS

| | | |
|---|---|---|
| JP | 03-107120 A | 5/1991 |
| JP | 05-224608 A | 9/1993 |

* cited by examiner

*Primary Examiner* — Mark R Gaworecki
(74) *Attorney, Agent, or Firm* — Volpe And Koenig, P.C.

(57) ABSTRACT

A three-dimensional image projector, including a transparent display medium within which fluorescent substances are dispersed, the fluorescent substances being dispersed for performing the fluorescent light-emission of visible light by the irradiation with a laser beam of invisible light, a first-laser-beam scanning unit for scanning the inside of the transparent display medium by deflecting a first laser beam, the first laser beam being used for exciting the fluorescent substances, and a second-laser-beam scanning unit for scanning the inside of the transparent display medium by deflecting a second laser beam, the second laser beam being used for exciting the fluorescent substances, wherein a stereoscopic image is formed at a scanning intersection point of the first laser beam and the second laser beam inside the transparent display medium.

17 Claims, 4 Drawing Sheets

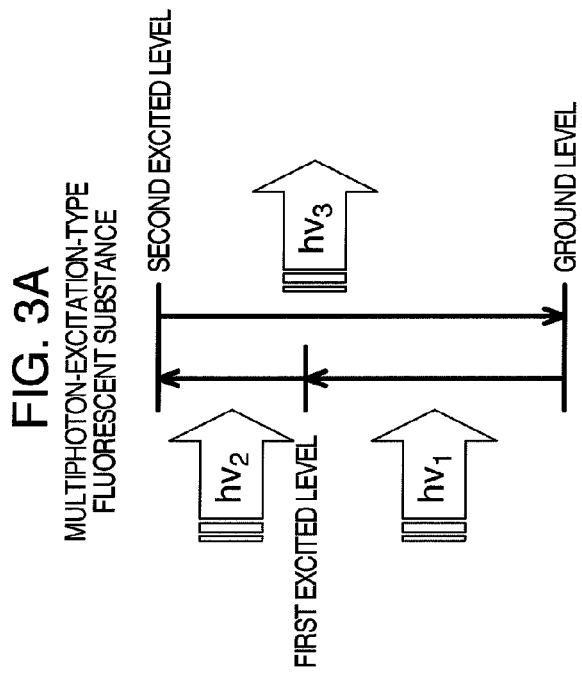

RED-LIGHT-EMISSION FLUORESCENT SUBSTANCES LEVEL

GREEN-LIGHT-EMISSION FLUORESCENT SUBSTANCES LEVEL

BLUE-LIGHT-EMISSION FLUORESCENT SUBSTANCES LEVEL

THREE-DIMENSIONAL IMAGE PROJECTOR

INCORPORATION BY REFERENCE

The present application claims priority from Japanese application JP2012-138315 filed on Jun. 20, 2012, the content of which is hereby incorporated by reference into this application.

BACKGROUND OF THE INVENTION

The present invention relates to an aerially-visible-image formation device for allowing a visible image, such as character or video, to be drawn in the air by using laser beams.

In recent years, there has been a skyrocketing expansion in the prevalence of three-dimensional liquid crystal TVs. In these three-dimensional liquid crystal TVs, two-dimensional images equipped with a stereoscopic parallax are displayed alternately. Moreover, these images displayed are watched alternately with right and left eyes via such tools as polarization spectacles. This method allows the stereoscopic effect to be visually recognized in these three-dimensional liquid crystal TVs. In this method, however, there exist the following problems: Namely, only the three-dimensional information in the range of about a both eyes' parallax angle can be visually recognized. Furthermore, the visually-recognized position is limited. Also, holography is practically utilized for forgery prevention in paper money and card.

In addition thereto, there exist various three-dimensional-image display technologies. For example, in JP-A-3-107120 and JP-A-5-224608, the disclosures have been made concerning three-dimensional-image formation technologies for forming a three-dimensional image in space.

In more detail, the three-dimensional-image formation technology disclosed in JP-A-3-107120 is as follows: Namely, an area where an excitation substance is distributed is irradiated with two types of beam-like invisible lights. As a result, the two-stage excitation phenomenon of the excitation substance is caused to occur at an intersection point of these two types of light beams. Moreover, a visible light (i.e., excited-radiation light) is emitted from the excitation substance when this substance returns from its excited state to its stable state (i.e., its ground state). Finally, the three-dimensional image is formed at the light beams' intersection point by utilizing this visible light emitted, and operating the two types of scanning light beams.

Also, the three-dimensional-image formation technology disclosed in JP-A-5-224608 is as follows: Namely, two pieces of two-dimensional laser arrays are deployed in such a manner as to become perpendicular to each other. Moreover, the three-dimensional image based on a fluorescent light is formed at the laser lights' intersection point by operating the scanning laser arrays. Here, this fluorescent light is emitted in a relaxation process during which the excited state relaxes.

SUMMARY OF THE INVENTION

According to JP-A-5-224608, it also becomes possible to implement a three-dimensional color display device. The use of the two-dimensional laser arrays, however, has made it difficult to accomplish the high-resolution implementation and large-sized implementation of the stereoscopic image. Also, in JP-A-3-107120, no consideration is given to an operation method of operating the scanning laser beams. As a result, there has existed the problem in its practical utilization.

An object of the present invention is to provide a three-dimensional image projector which permits accomplishment of the high-resolution implementation and large-sized implementation of a stereoscopic image projected thereby.

In order to solve the above-described problems, the three-dimensional image projector of the present invention is configured as follows: The three-dimensional image projector, including a transparent display medium within which fluorescent substances are dispersed, the fluorescent substances being dispersed for performing the fluorescent light-emission of visible light by the irradiation with a laser beam of invisible light, a first-laser-beam scanning unit for scanning the inside of the transparent display medium by deflecting a first laser beam, the first laser beam being used for exciting the fluorescent substances, and a second-laser-beam scanning unit for scanning the inside of the transparent display medium by deflecting a second laser beam, the second laser beam being used for exciting the fluorescent substances, wherein a stereoscopic image is formed in such a manner that the excitation of the fluorescent substances, which is caused by the irradiation with the first laser beam, and the excitation of the fluorescent substances, which is caused by the irradiation with the second laser beam, are superimposed on each other, thereby performing the fluorescent light-emission, and forming the stereoscopic image, the stereoscopic image being formed at a scanning intersection point of the first laser beam and the second laser beam inside the transparent display medium.

In particular, in the case of displaying a stereoscopic image equipped with colors, the transparent display medium is so configured as to include red-light-emission fluorescent substances for performing the fluorescent light-emission of red color, green-light-emission fluorescent substances for performing the fluorescent light-emission of green color, and blue-light-emission fluorescent substances for performing the fluorescent light-emission of blue color. Furthermore, the second laser beam is so configured as to be a laser beam which is formed by superimposing on each other the laser light from a laser-light source for exciting the red-light-emission fluorescent substances, the laser light from a laser-light source for exciting the green-light-emission fluorescent substances, and the laser light from a laser-light source for exciting the blue-light-emission fluorescent substances.

According to the present invention, a three-dimensional image is formed by operating scanning laser beams with the use of such tools as MEMS mirrors. This feature facilitates accomplishment of the high-resolution implementation and large-sized implementation of the stereoscopic image.

BRIEF DESCRIPTION OF THE DRAWINGS

FIGS. 3A and 3B are diagrams for explaining the excited-light-emission energy levels of each fluorescent substance of the present invention.

DETAILED DESCRIPTION OF THE INVENTION

Figure 1:
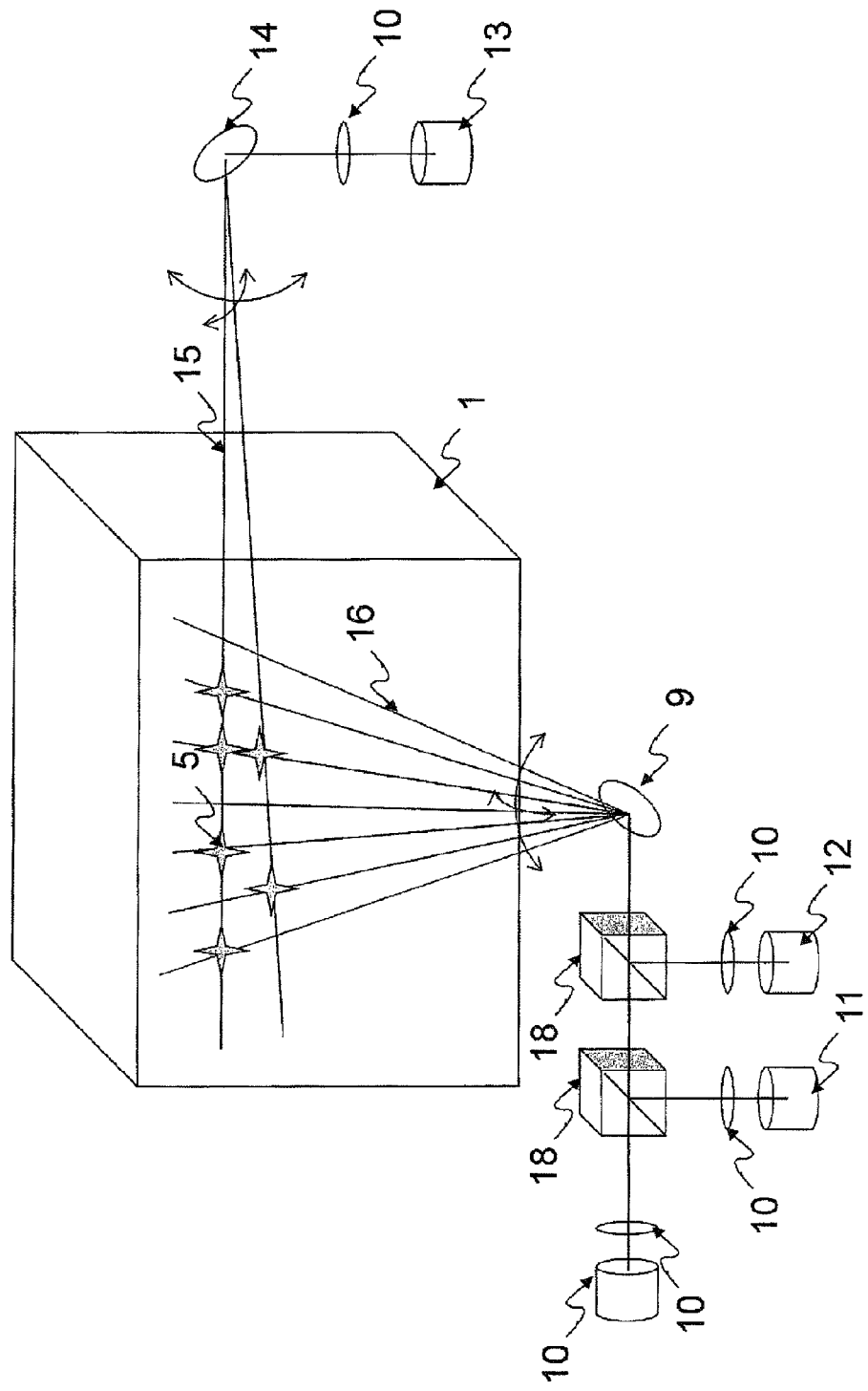
FIG. 1 is a diagram for explaining the basic configuration of an embodiment of the present invention.

Hereinafter, referring to the drawings, the explanation will be given below concerning an embodiment of the present invention.

FIG. 1 is a diagram for explaining the basic configuration of a three-dimensional image projector of the embodiment. In this three-dimensional image projector of the embodiment, a stereoscopic image is formed within a transparent display medium 1. This transparent display medium 1 is configured by dispersing fluorescent substances within a medium such as a resin. Incidentally, the details of the fluorescent substances will be described later. Moreover, the inside of the transparent display medium 1 is scanned by a laser beam 16 outputted from laser-light sources 10, 11, and 12, and a laser beam 15 outputted from a laser-light source 13. This scanning is performed and controlled by scanning mirrors 9 and 14 from two mutually-perpendicular directions of the transparent display medium 1, respectively. Here, although the details will be described later, the laser beam 16 is a secondary-excitation laser beam that is equipped with secondary-excitation wavelengths each of which corresponds to and excites each of the light's three primary colors. Meanwhile, the laser beam 15 is so formed as to become a primary-excitation laser beam that is equipped with a primary-excitation wavelength which is common to the light's three primary colors.

The scanning mirrors 9 and 14 are subjected to an oscillation control in a manner of being synchronized with each other, so that an intersection point 5 of the laser beam 15 and the laser beam 16 is formed at each lattice point that is obtained as a result of the lattice division of the transparent display medium 1. Furthermore, the optical output from the laser-light sources 10, 11, and 12 for outputting the secondary-excitation laser beam 16, and the optical output from the laser-light source 13 for outputting the primary-excitation laser beam 15 are controlled in accordance with image information that corresponds to the intersection point 5. This optical-output control allows the formation of the stereoscopic image.

In the embodiment illustrated in FIG. 1, the laser beam 16 is formed as follows: Namely, outputted laser beams from the laser-light sources 10, 11, and 12, each of which is equipped with each of the secondary-excitation wavelengths for exciting each of the light's three primary colors, are parallelized by collimator lenses 10, then being superimposed on each other by synthesis prisms 18. Moreover, the scanning mirror 9 is irradiated with the laser beam 16 formed in this way.

Here, the laser-light source 10 outputs the laser beam whose wavelength is equal to $\lambda_2$ for causing the fluorescent substances to emit a red excitation light. Also, the laser-light source 11 outputs the laser beam whose wavelength is equal to $\lambda_3$ for causing the fluorescent substances to emit a green excitation light. Also, the laser-light source 12 outputs the laser beam whose wavelength is equal to $\lambda_4$ for causing the fluorescent substances to emit a blue excitation light.

The laser beam 15 illustrated in FIG. 1 is the primary-excitation laser beam that is equipped with the primary-excitation wavelength which is common to the respective colors. The laser beam 15 is formed as follows: Namely, a laser beam whose wavelength is equal to $\lambda_1$ is outputted by the laser-light source 13, then being parallelized by the collimator lens 10. Furthermore, the scanning mirror 14 is irradiated with the laser beam 15 formed in this way.

In FIG. 1, the primary-excitation laser beam is outputted by the single laser-light source 13. However, laser-light sources for outputting respective colors' primary-excitation laser beams may also be installed in harmony with the characteristics of the fluorescent substances. In this case, it is preferable to configure the primary-excitation laser beams in the same manner as the laser beam 16.

Next, the explanation will be given below concerning the light-emission mechanism of each of the fluorescent substances at the intersection point 5 of the laser beam 15 and the laser beam 16. Each fluorescent substance contained within the transparent display medium 1 is the following substance: Namely, an electron inside each fluorescent substance is excited by the irradiation with a certain energy. Moreover, an emitted light is generated when this excited electron transitions (i.e., displaces) to its ground state. In the present embodiment, as illustrated in FIGS. 4A to 4C, the colors' three primary colors are excited using three types of fluorescent substances, i.e., red-light-emission fluorescent substances, green-light-emission fluorescent substances, and blue-light-emission fluorescent substances.

Figure 4A:
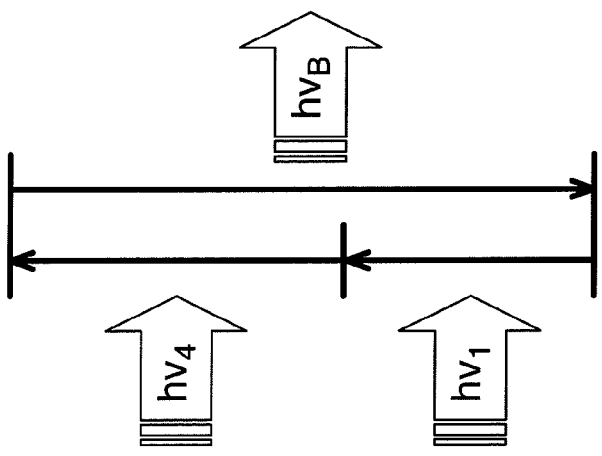
FIGS. 4A to 4C are diagrams for explaining the excited-light-emission energy levels of the fluorescent substances for implementing the color display.

More concretely, each of the red-light-emission fluorescent substances in FIG. 4A is irradiated with the $\lambda_1$-wavelength laser light by the laser beam 15. As a result of this laser irradiation, each red-light-emission fluorescent substance is excited from its ground level up to its first excited level by the supply of an excitation energy of $hv_1$. Subsequently, each fluorescent substance is irradiated with the $\lambda_2$-wavelength laser light by the laser beam 16. As a result of this laser irradiation, each fluorescent substance is excited from its first excited level up to its second excited level by the supply of an excitation energy of $hv_2$. Moreover, when each fluorescent substance, which is now excited up to its second excited level, transitions to its ground state, the release of an energy of $hvR$ is performed. Here, this energy of $hv_R$ is equivalent to the laser-irradiations-based excitation energy (: $hv_1+hv_2$). At this time, this energy release is performed as the emission of a fluorescent light whose wavelength is of red color.

Figure 4B:
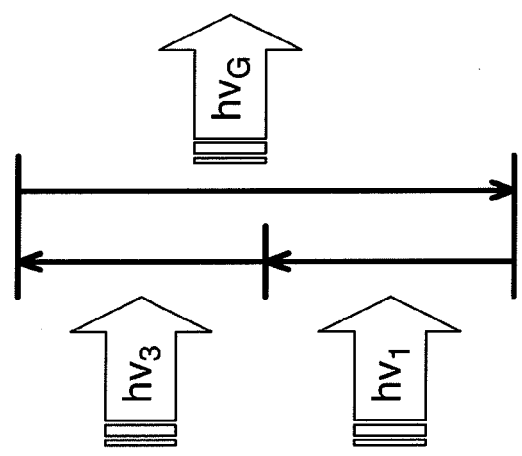

Similarly, each of the green-light-emission fluorescent substances in FIG. 4B is irradiated with the $\lambda_1$-wavelength laser light by the laser beam 15. Subsequently, each green-light-emission fluorescent substance is irradiated with the $\lambda_3$-wavelength laser light by the laser beam 16. As a result of these laser irradiations, each fluorescent substance is excited from its ground level up to its second excited level. Moreover, when each fluorescent substance, which is now excited up to its second excited level, transitions to its ground state, the release of an energy of $hv_G$ is performed. Here, this energy of $hv_G$ is equivalent to the laser-irradiations-based excitation energy (: $hv_1+hv_3$). At this time, this energy release is performed as the emission of a fluorescent light whose wavelength is of green color.

Figure 4C:
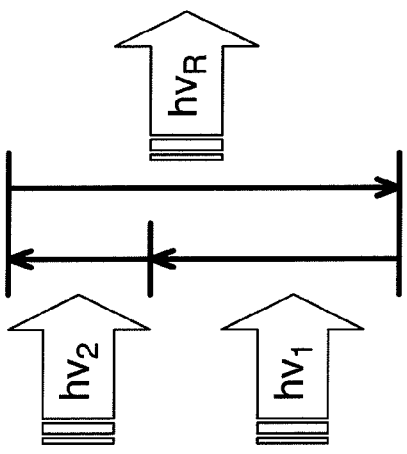

Furthermore, each of the blue-light-emission fluorescent substances in FIG. 4C is irradiated with the $\lambda_1$-wavelength laser light by the laser beam 15. Subsequently, each blue-light-emission fluorescent substance is irradiated with the $\lambda_4$-wavelength laser light by the laser beam 16. As a result of these laser irradiations, each fluorescent substance is excited from its ground level up to its second excited level. Moreover, when each fluorescent substance, which is now excited up to its second excited level, transitions to its ground state, the release of an energy of $hv_B$ is performed. Here, this energy of $hv_B$ is equivalent to the laser-irradiations-based excitation energy (: $hv_1+hv_4$). At this time, this energy release is performed as the emission of a fluorescent light whose wavelength is of blue color.

In the present embodiment, the wavelength $\lambda_1$ of the laser beam 15, and the wavelengths $\lambda_2$, $\lambda_3$, and $\lambda_4$ of the laser beam 16 are wavelengths of invisible light beams included in the ultraviolet or infrared region. Also, the fluorescent substances equipped with the above-described characteristics are selected appropriately. Also, the description will be given later regarding concrete materials for the fluorescent substances. Here, the fluorescent substances' excitation wavelengths (corresponding to the energies) exhibit selectivity, and the fluorescent substances' light-emission wavelengths differ from each other.

Also, the fluorescent substances are classified into the three types of fluorescent substances, i.e., the red-light-emission fluorescent substances, the green-light-emission fluorescent substances, and the blue-light-emission fluorescent substances. Moreover, the secondary-excitation laser wavelengths are classified on each type basis of the fluorescent substances, then changing laser intensities of the respective colors to be superimposed on each other. This method permits the red-light-emission, green-light-emission, and blue-light-emission's intensities at the superimposition point to be controlled independently of each other.

In FIGS. 4A to 4C, the laser beam 15 is formed as the primary-excitation laser beam equipped with the primary-excitation wavelength $\lambda_1$ which is common to the respective colors. As was exactly described earlier, however, the laser-light sources may also be installed which are used for outputting the primary-excitation laser beams whose wavelengths differ from each other on each color basis. This case results in an enhancement in the degree of freedom for the selection of the fluorescent substances.

As was exactly described above, the visible fluorescent light is excited at the intersection point 5 of the laser beam 15 and the laser beam 16. In the other locations, however, the visible fluorescent light is not generated, but the invisible scanning laser beams are operated. As a result, the visual recognition is not accomplished in the other locations. This condition permits the stereoscopic image to be displayed in the transparent display medium 1.

Each of the fluorescent substances whose light-emission mechanism was explained above is referred to as "multiphoton-excitation-type fluorescent substance". In addition thereto, as illustrated in FIGS. 3A and 3B, the stereoscopic image can also be formed similarly in the so-called photo-stimulable-luminescence-type fluorescent substance. This photostimulable-luminescence-type fluorescent substance is the following fluorescent substance: Namely, an electron therein is excited up to its first high excited level by a first excitation light (included in the ultraviolet region, in general). After that, this excited electron transitions to its first intermediate level existing at an intermediate energy level. Still after that, this electron is excited up to its second excited level by a second excitation light. Finally, this electron emits a visible light-ray.

Figure 2:
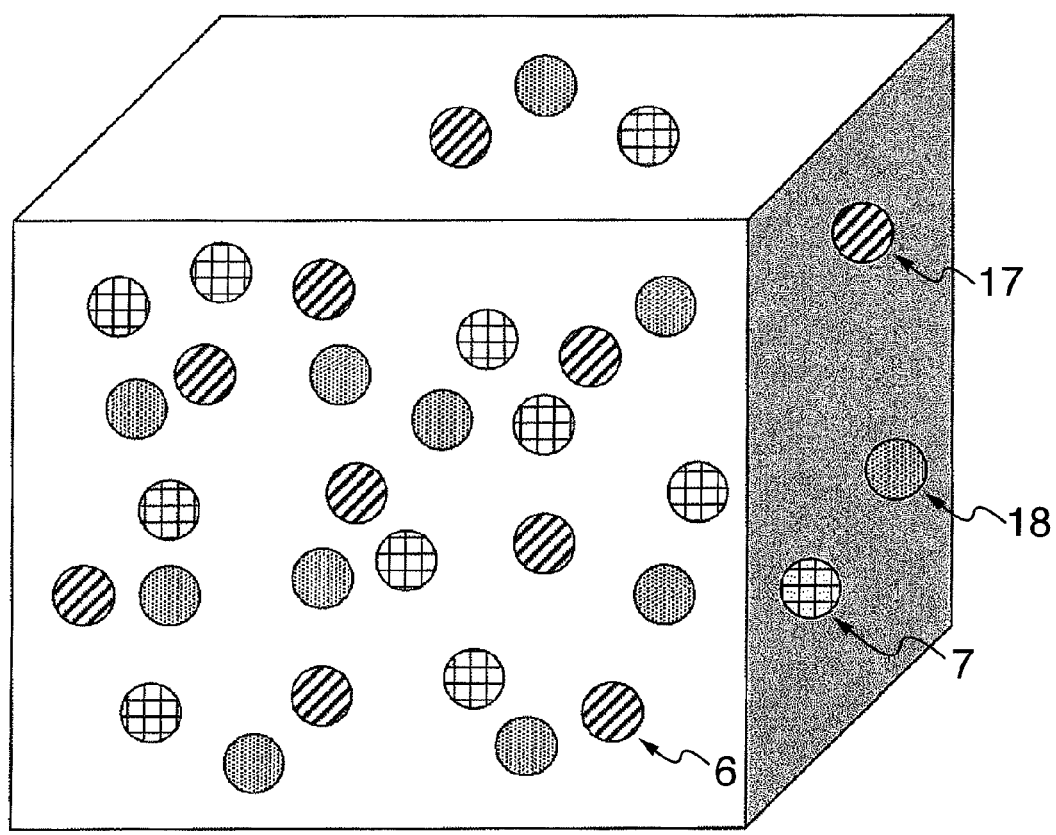
FIG. 2 is a diagram for explaining a stereoscopic display medium of the embodiment.

FIG. 2 illustrates the configuration of the transparent display medium 1. This transparent display medium 1 is configured as follows: Namely, three types of fluorescent-substance powders, i.e., red-light-emission fluorescent-substance powders 6, green-light-emission fluorescent-substance powders 7, and blue-light-emission fluorescent-substance powders 8, are dispersedly deployed in a uniform manner within a transparent support medium 1. The substances selectable as the transparent display medium 1 are solid such as each type of glass or resin, liquid such as water, and gas such as air.

Concretely, each red-light-emission fluorescent-substance powder 6 is $Y_{(1-x-y)}Yb_xEr_yOCl$. Each green-light-emission fluorescent-substance powder 7 is $Y_{(1-x-y)}Yb_xEr_yF_3$, $NaY_{(1-x-y)}Yb_xEr_yF_4$, or $BaY_{(2-x-y)}Yb_xEr_yF_g$. Each blue-light-emission fluorescent-substance powder 8 is $Y_{(1-x-y)}Yb_xTm_yF_3$. The concrete materials for the fluorescent substances, however, are not limited to the above-described materials. Namely, it is also allowable to use fluorescent substances composed of inorganic materials other than the above-described materials, or fluorescent substances composed of organic materials.

Each of the fluorescent-substance powders 6, 7, and 8 is more microscopic as compared with the diameter of the laser beams 15 and 16. Accordingly, plural pieces of fluorescent-substance powders 6, 7, and 8 are included within the intersection point 5 of the laser beams 15 and 16. On account of this condition, the red, green, and blue fluorescent light-emissions explained above are caused to occur simultaneously. Moreover, operating the scanning laser beams 15 and 16 displaces the intersection-point position sequentially, thereby displacing the fluorescent light-emission position sequentially. This scheme allows the formation of the stereoscopic image.

Each of the fluorescent-substance powders 6, 7, and 8 requires a fluorescent light-persistence time by the amount of a scanning time for the stereoscopic image. In the three-dimensional image projector of the present invention, however, operating the scanning laser beams 15 and 16 allows the formation of the stereoscopic image. This scheme, as will be explained next, makes it possible to shorten a scanning period for the stereoscopic image. This scanning period shortened results in an enhancement in the degree of freedom for the selection of the fluorescent substances.

In the present embodiment, the intersection-point position of the laser beams inside the transparent display medium 1 executes the fluorescent light-emission, thereby allowing execution of the stereoscopic-image display. Accordingly, it is unnecessary to operate the scanning laser beams in an internal portion of the transparent display medium 1 other than the intersection-point position that corresponds to the surface of the stereoscopic image. On account of this condition, in the basic configuration diagram illustrated in FIG. 1, the operations of the scanning mirrors 9 and 14 are controlled by a not-illustrated mirror-scanning control unit in such a manner that consideration and attention are paid to the intersection-point position corresponding to the surface of the stereoscopic image. Subsequently, lit-up controls over the laser-light sources 10, 11, 12, and 13 are performed in synchronization with the controls over the operations of the scanning mirrors. This control scheme makes it possible to suppress the operation of the scanning laser beams within the unnecessary internal portion, thereby making it possible to shorten the light-emission period at the laser beams' intersection point. As a consequence, it becomes possible to use even a fluorescent-substance material whose fluorescent light-persistence time is short.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A three-dimensional image projector, comprising:
   a transparent display medium within which fluorescent substances are dispersed, said fluorescent substances being dispersed for performing fluorescent light-emission of visible light by irradiation with a laser beam of invisible light;
   first-laser-beam scanning means for scanning inside of said transparent display medium by deflecting a first laser beam, said first laser beam being used for exciting said fluorescent substances; and
   second-laser-beam scanning means for scanning said inside of said transparent display medium by deflecting a second laser beam, said second laser beam being used for exciting said fluorescent substances, wherein
   a stereoscopic image is formed in such a manner that excitation of said fluorescent substances, which is caused by said irradiation with said first laser beam, and excitation of said fluorescent substances, which is caused by said irradiation with said second laser beam, are superimposed on each other, thereby performing said fluorescent light-emission, and forming said stereoscopic image, said stereoscopic image being formed at a scanning intersection point of said first laser beam and said second laser beam inside said transparent display medium.

2. The three-dimensional image projector according to claim 1, wherein
wavelength range of said plural pieces of laser light from said first laser-light source to said seventh laser-light source is the ultraviolet region, or the infrared region.

3. The three-dimensional image projector according to claim 2, wherein
said fluorescent substances dispersed within said transparent display medium are multiphoton-excitation-type fluorescent substances.

4. The three-dimensional image projector according to claim 2, wherein
said fluorescent substances dispersed within said transparent display medium are photostimulable-luminescence-type fluorescent substances.

5. The three-dimensional image projector according to claim 1, wherein
said fluorescent substances dispersed within said transparent display medium are multiphoton-excitation-type fluorescent substances.

6. The three-dimensional image projector according to claim 1, wherein
said fluorescent substances dispersed within said transparent display medium are photostimulable-luminescence-type fluorescent substances.

7. The three-dimensional image projector according to claim 1, wherein
said scanning intersection point of said first laser beam and said second laser beam inside said transparent display medium corresponds to surface's profile of said stereoscopic image to be displayed.

8. A three-dimensional image projector, comprising:
a transparent display medium including red-light-emission fluorescent substances for performing fluorescent light-emission of red color by irradiation with a laser beam of invisible light, green-light-emission fluorescent substances for performing fluorescent light-emission of green color by said irradiation therewith, and blue-light-emission fluorescent substances for performing fluorescent light-emission of blue color by said irradiation therewith;
a first laser-light source for outputting invisible laser light for changing excited state of said red-light-emission fluorescent substances, that of said green-light-emission fluorescent substances, and that of said blue-light-emission fluorescent substances;
a second laser-light source for outputting invisible laser light for changing said excited state of said red-light-emission fluorescent substances;
a third laser-light source for outputting invisible laser light for changing said excited state of said green-light-emission fluorescent substances;
a fourth laser-light source for outputting invisible laser light for changing said excited state of said blue-light-emission fluorescent substances;
first-laser-beam scanning means for scanning inside of said transparent display medium by deflecting said invisible laser beam outputted from said first laser-light source; and
second-laser-beam scanning means for scanning said inside of said transparent display medium by deflecting a laser beam, said laser beam being formed by superimposing on each other said outputted beam from said second laser-light source, said outputted beam from said third laser-light source, and said outputted beam from said fourth laser-light source, wherein
a stereoscopic image is formed in such a manner that
excitation of said red-light-emission fluorescent substances, which is caused by said laser light from said first laser-light source, and excitation of said red-light-emission fluorescent substances, which is caused by said laser light from said second laser-light source, are superimposed on each other, thereby performing said fluorescent light-emission of said red color,
excitation of said green-light-emission fluorescent substances, which is caused by said laser light from said first laser-light source, and excitation of said green-light-emission fluorescent substances, which is caused by said laser light from said third laser-light source, being superimposed on each other, thereby performing said fluorescent light-emission of said green color,
excitation of said blue-light-emission fluorescent substances, which is caused by said laser light from said first laser-light source, and excitation of said blue-light-emission fluorescent substances, which is caused by said laser light from said fourth laser-light source, being superimposed on each other, thereby performing said fluorescent light-emission of said blue color, and
forming said stereoscopic image, said stereoscopic image being formed at a scanning intersection point of said first laser beam and said second laser beam inside said transparent display medium.

9. The three-dimensional image projector according to claim 8, wherein
wavelength range of said plural pieces of laser light from said first laser-light source to said seventh laser-light source is the ultraviolet region, or the infrared region.

10. The three-dimensional image projector according to claim 8, wherein
said fluorescent substances dispersed within said transparent display medium are multiphoton-excitation-type fluorescent substances.

11. The three-dimensional image projector according to claim 8, wherein
said fluorescent substances dispersed within said transparent display medium are photostimulable-luminescence-type fluorescent substances.

12. The three-dimensional image projector according to claim 8, wherein
said scanning intersection point of said first laser beam and said second laser beam inside said transparent display medium corresponds to surface's profile of said stereoscopic image to be displayed.

13. A three-dimensional image projector, comprising:
a transparent display medium including red-light-emission fluorescent substances for performing fluorescent light-emission of red color by irradiation with a laser beam of invisible light, green-light-emission fluorescent substances for performing fluorescent light-emission of green color by said irradiation therewith, and blue-light-emission fluorescent substances for performing fluorescent light-emission of blue color by said irradiation therewith;
a second laser-light source and a fifth laser-light source for outputting invisible laser light for changing excited state of said red-light-emission fluorescent substances;
a third laser-light source and a sixth laser-light source for outputting invisible laser light for changing excited state of said green-light-emission fluorescent substances;

a fourth laser-light source and a seventh laser-light source for outputting invisible laser light for changing excited state of said blue-light-emission fluorescent substances;

first-laser-beam scanning means for scanning inside of said transparent display medium by deflecting a laser beam, said laser beam being formed by superimposing on each other said outputted beam from said fifth laser-light source, said outputted beam from said sixth laser-light source, and said outputted beam from said seventh laser-light source; and second-laser-beam scanning means for scanning said inside of said transparent display medium by deflecting a laser beam, said laser beam being formed by superimposing on each other said outputted beam from said second laser-light source, said outputted beam from said third laser-light source, and said outputted beam from said fourth laser-light source, wherein a stereoscopic image is formed in such a manner that excitation of said red-light-emission fluorescent substances, which is caused by said laser light from said fifth laser-light source, and excitation of said red-light-emission fluorescent substances, which is caused by said laser light from said second laser-light source, are superimposed on each other, thereby performing said fluorescent light-emission of said red color, excitation of said green-light-emission fluorescent substances, which is caused by said laser light from said sixth laser-light source, and excitation of said green-light-emission fluorescent substances, which is caused by said laser light from said third laser-light source, being superimposed on each other, thereby performing said fluorescent light-emission of said green color, excitation of said blue-light-emission fluorescent substances, which is caused by said laser light from said seventh laser-light source, and excitation of said blue-light-emission fluorescent substances, which is caused by said laser light from said fourth laser-light source, being superimposed on each other, thereby performing said fluorescent light-emission of said blue color, and forming said stereoscopic image, said stereoscopic image being formed at a scanning intersection point of said first laser beam and said second laser beam inside said transparent display medium.

14. The three-dimensional image projector according to claim 13, wherein wavelength range of said plural pieces of laser light from said first laser-light source to said seventh laser-light source is the ultraviolet region, or the infrared region.

15. The three-dimensional image projector according to claim 13, wherein said fluorescent substances dispersed within said transparent display medium are multiphoton-excitation-type fluorescent substances.

16. The three-dimensional image projector according to claim 13, wherein said fluorescent substances dispersed within said transparent display medium are photostimulable-luminescence-type fluorescent substances.

17. The three-dimensional image projector according to claim 13, wherein said scanning intersection point of said first laser beam and said second laser beam inside said transparent display medium corresponds to surface's profile of said stereoscopic image to be displayed.

* * * * *

UNITED STATES PATENT AND TRADEMARK OFFICE
CERTIFICATE OF CORRECTION

| | | |
|---|---|---|
| PATENT NO. | : 8,658,988 B2 | Page 1 of 1 |
| APPLICATION NO. | : 13/871424 | |
| DATED | : February 25, 2014 | |
| INVENTOR(S) | : Keiichi Betsui | |

It is certified that error appears in the above-identified patent and that said Letters Patent is hereby corrected as shown below:

ON THE TITLE PAGE

After item (65) and before item (51), please insert
--(30) Foreign Application Priority data--
--Jun. 20, 2012   (JP)   2012-138315--

Signed and Sealed this
Eleventh Day of November, 2014

Michelle K. Lee
*Deputy Director of the United States Patent and Trademark Office*